United States Patent
Greenberg et al.

(10) Patent No.: US 8,880,614 B1
(45) Date of Patent: Nov. 4, 2014

(54) METHOD AND APPARATUS FOR DYNAMICALLY PROTECTING A MAIL SERVER

(75) Inventors: Albert G. Greenberg, Summit, NJ (US);
Patrick Haffner, Atlantic Highlands, NJ (US); Subhabrata Sen, New Providence, NJ (US); Oliver Spatscheck, Randolph, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1512 days.

(21) Appl. No.: 11/598,582

(22) Filed: Nov. 13, 2006

(51) Int. Cl.
*H04L 12/58* (2006.01)

(52) U.S. Cl.
USPC .......................................... 709/206; 455/466

(58) Field of Classification Search
CPC ... H04L 63/1441; H04L 12/58; H04L 12/585; H04M 1/72552

USPC .......................................................... 709/206
See application file for complete search history.

(56) References Cited

U.S. PATENT DOCUMENTS

| 7,464,264 | B2* | 12/2008 | Goodman et al. | 713/154 |
|---|---|---|---|---|
| 7,483,947 | B2* | 1/2009 | Starbuck et al. | 709/206 |
| 7,756,535 | B1* | 7/2010 | Diao et al. | 455/466 |
| 2004/0039786 | A1* | 2/2004 | Horvitz et al. | 709/207 |
| 2005/0188028 | A1* | 8/2005 | Brown et al. | 709/206 |
| 2006/0095524 | A1* | 5/2006 | Kay et al. | 709/206 |
| 2007/0185960 | A1* | 8/2007 | Leiba et al. | 709/206 |
| 2012/0239769 | A1* | 9/2012 | Tevanian | 709/206 |

\* cited by examiner

*Primary Examiner* — Asad Nawaz
*Assistant Examiner* — Jason Harley

(57) ABSTRACT

A method and apparatus for providing protection for mail servers in networks such as the packet networks are disclosed. For example, the present method detects a mail server is reaching its processing limit. The method then selectively limits connections to the mail server from a plurality of source nodes based on a spam index associated with each of the source nodes.

9 Claims, 4 Drawing Sheets

METHOD AND APPARATUS FOR DYNAMICALLY PROTECTING A MAIL SERVER

The present invention relates generally to protection of IP networks and, in particular, to a method and apparatus for providing protection to mail servers in networks.

BACKGROUND OF THE INVENTION

Much of today's important business and consumer applications rely on communications infrastructures such as the Internet. Businesses and consumers need to provide protection to their network from hostile activities while being able to communicate with others via the infrastructure. For example, businesses need to be able to communicate with customers and suppliers via email. However, businesses need to minimize the amount of unsolicited and undesirable email (SPAM) delivered to endpoint devices such as computers. The protection of endpoint devices is typically accomplished by using a mail server to filter incoming mail prior to forwarding to the endpoint devices. The mail server redirects or removes the SPAM email such that the endpoint devices will not receive the email. Thus, the mail server receives and processes all the non-SPAM and SPAM emails. This process is effective when the mail server is operating below its capacity level. Unfortunately, the SPAM sources may grow very quickly via the use of Botnets that can be quickly made available to SPAM sources. As such, SPAM email processing is consuming a larger and larger percentage of the processing power of mail servers. If the mail server's processing capacity is exceeded or overloaded due to a sudden large amount of SPAM emails, then the mail servers will implement drastic actions such as denying connections. However, the connection denial process treats SPAM and non-SPAM emails the same way, thereby impacting the movement of legitimate emails for businesses.

Therefore, there is a need for a method and apparatus to provide protection for mail servers.

SUMMARY OF THE INVENTION

In one embodiment, the present invention discloses a method and apparatus for providing protection for mail servers. For example, the present method detects a mail server is reaching its processing limit. The method then selectively limits connections to the mail server from a plurality of source nodes based on a spam index associated with each of the source nodes.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing protection for mail servers. Although the present invention is discussed below in the context of IP networks, the present invention is not so limited. Namely, the present invention can be used for other networks such as the cellular network, etc.

Furthermore, although the present invention is described below in the context of SPAM emails, the present invention is not so limited. For example, the present invention can also be implemented to address SPAM voicemails as well.

Figure 1:
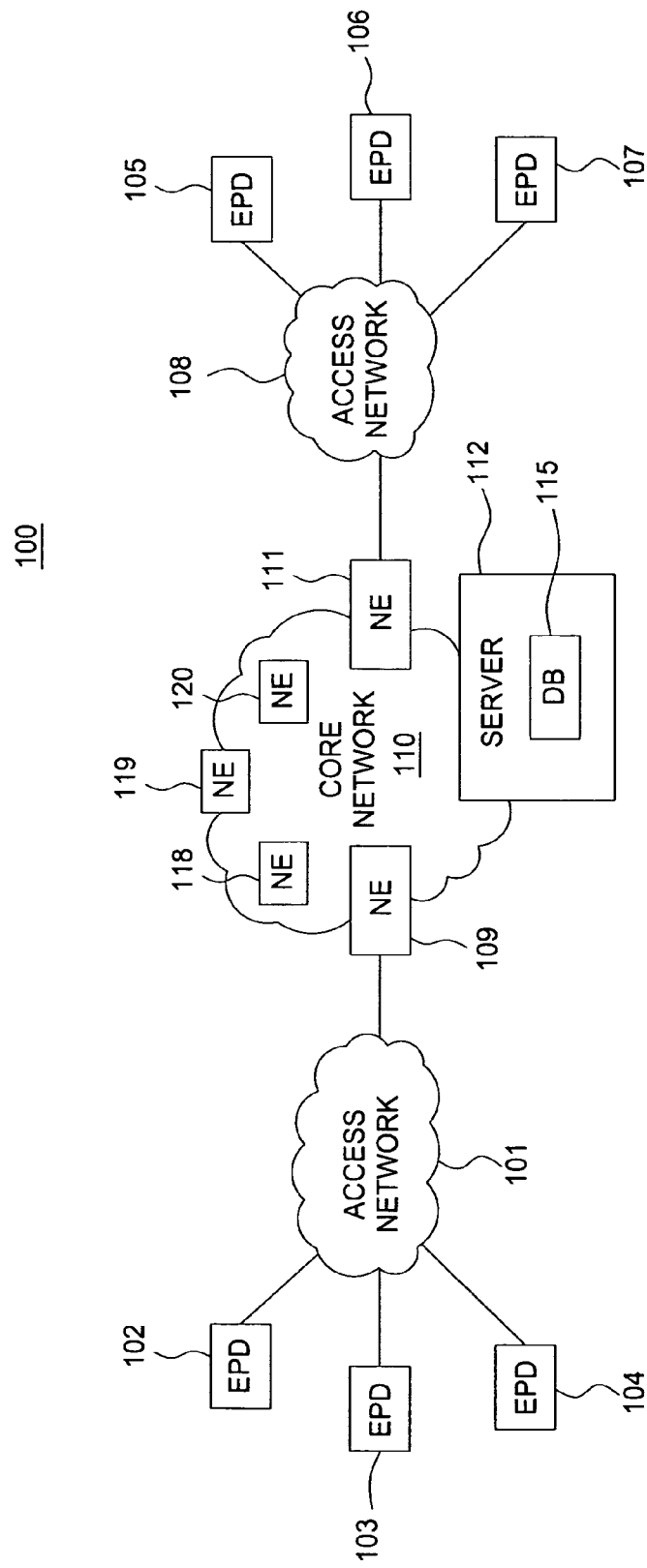
FIG. 1 illustrates an exemplary network related to the present invention.

FIG. 1 is a block diagram depicting an exemplary configuration of a communication system 100 constructed in accordance with one or more aspects of the invention. In one embodiment, a plurality of endpoint devices 102-104 is configured for communication with the core packet network 110 via an access network 101. Similarly, a plurality of endpoint devices 105-107 are configured for communication with the core packet network 110 (e.g., an IP based core backbone network supported by a service provider) via an access network 108. The network elements 109 and 111 may serve as gateway servers or edge routers for the network 110. Those skilled in the art will realize that although only six endpoint devices, two access networks, and five network elements (NEs) are depicted in FIG. 1, the communication system 100 may be expanded by including additional endpoint devices, access networks, and network elements without altering the present invention.

The endpoint devices 102-107 may comprise customer endpoint devices such as personal computers, laptop computers, personal digital assistants (PDAs), servers, and the like. The access networks 101 and 108 serve as a conduit to establish a connection between the endpoint devices 102-107 and the NEs 109 and 111 of the core network 110. The access networks 101, 108 may each comprise a digital subscriber line (DSL) network, a broadband cable access network, a local area network (LAN), a wireless access network (WAN), and the like. Some NEs (e.g., NEs 109 and 111) reside at the edge of the core infrastructure and interface with customer endpoints over various types of access networks. An NE is typically implemented as an edge router, a media gateway, a border element, a firewall, and the like. An NE may also include a component that resides within the network (e.g., NEs 118-120) such as a honeypot, a tarpit, a mail server, or like devices. The core network 110 may also comprise an application server 112 that contains a database 115. The application server 112 may comprise any server or computer that is well known in the art, and the database 115 may be any type of electronic collection of data that is well known in the art. (See also FIG. 4).

The above IP network is described to provide an illustrative environment in which mail packets in general (e.g., email packets or voicemail packets) are transmitted on communication networks. For example, businesses need to be able to communicate with customers, suppliers, etc. via electronic mail. However, businesses want to minimize the amount of unsolicited and undesirable mails delivered to their endpoint devices such as computers, laptops, personal digital assistants (PDAs), mobile phones and the like. The protection of endpoint devices can be accomplished by using a mail server to filter incoming mail prior to forwarding to the endpoint devices. For example, the mail server redirects or removes the unwanted (spam) electronic mails such that the endpoint devices will not receive the unwanted electronic mails. Unfortunately, if the mail server's processing capacity is exceeded or overloaded due to a sudden large amount of SPAM mails, then the mail servers will implement drastic actions such as denying connections. However, the connection denial process treats SPAM and non-SPAM mails the same way, thereby impacting the movement of legitimate mails for businesses.

Therefore, there is a need for a method and apparatus that provides protection for mail servers. In order to better describe the present invention, the following terminologies will first be provided:

Mail server;
Simple Mail Transfer Protocol (SMTP);
Post Office Protocol 3 (POP3) and Internet Message Access Protocol 4 (IMAP4);
A mail filter;
Spam;
Spam filter;
Network access switch.

Mail server refers to an application server that controls the distribution and storage of mail messages (e.g., emails or voicemails) using either Post Office Protocol 3 (POP3) or Internet Message Access Protocol 4 (IMAP4) access protocol to communicate with the users' mail program as described below.

Simple Mail Transfer Protocol (SMTP) refers to a standard email protocol on the Internet and Transmission Control Protocol over Internet Protocol (TCP/IP) protocol suite that is used to transfer mail messages between systems and provide notification regarding incoming mail. SMTP defines the message format, and the message transfer agent (MTA) which stores and forwards the mail. SMTP servers route SMTP messages throughout the Internet to a mail server that provides a message store for incoming mail.

Post Office Protocol 3 (POP3) and Internet Message Access Protocol 4 (IMAP4) are standard interface protocols used for communication between email client programs and mail servers. POP3 and IMAP4 provide message stores that hold incoming email until the user log on and download the stored emails. However, POP3 is a simpler protocol with limited options. For example, when using POP3 all pending messages and attachments are downloaded when a user checks his/her email. On the contrary, IMAP4 may be configured to download only the headers when the user logs on (to display to/from addresses and subject) and enable the user to selectively download the content and attachments.

A mail filter is a type of software that processes incoming mail messages (e.g., email messages or voicemail messages) based on filtering criteria to either forward the mail to the user's mailbox or divert the mail away from the user. The mail filter may pass the received mail through unchanged for delivery to the user's mailbox, may redirect for delivery elsewhere, or may simply discard the mail. Mail filters may be installed in the firewall, mail server, user's computer, etc. The filtering criteria may be based on sender's email address, specific words in the subject and/or message, type of attachment, blacklists containing addresses to be rejected, whitelists containing addresses to be accepted, etc. Some filters may also include Artificial Intelligence (AI) techniques to look for key words, to determine the meanings or context of the mail, etc. to minimize the number of mails discarded in error.

Spam refers to unsolicited and undesirable mail (e.g., email or voicemail) sent without permission from the recipients. The recipient typically bears the cost of processing and storing the unsolicited mail. Spammers may go to great length to conceal the origin of the message by using vulnerable third-party systems such as open proxy servers, Botnets, etc. Internet users deploy spam filters as defined below to prevent spam mail from reaching end users.

Spam filter is a type of mail filter that processes incoming mail messages based on criteria established for identifying spam mail and prevent it from reaching the endpoint devices. The spam filter may be deployed in a router, firewall, etc. It receives and processes all incoming mail, and then forwards non-spam mail to the user's mailbox while it discards or diverts spam mail to another location.

Network access switch refers to a switch or a router that operates at the Transmission Control Protocol (TCP) over Internet Protocol (IP) networking layer to permit or deny passage of inbound IP packets from computers outside of a protected network.

Spammers continue to increase their mail sending capacity to increase the chances of their spam mails reaching the recipients. Unfortunately, if a mail server reaches its load limit, then connections are either denied or dropped. Note that the spam and non-spam mails are treated the same way in the above process and are denied connection equally. The traditional process of removing spam mails is effective only if the processing capacity of the mail server has not been exceeded. However once exceeded, the mail server may treat spam and non-spam mails alike, thereby impacting the normal transmission of mails between legitimate businesses or customers. Therefore, there is a need for a method that provides protection for the mail servers.

The current invention provides a method to protect mail servers. In one embodiment, the method maximizes acceptance of non-spam mails during high load situations by applying a rate limiting method that is based on the ranking of the sender IP addresses in terms of their likelihood to send spam mails to the recipient.

Figure 2:
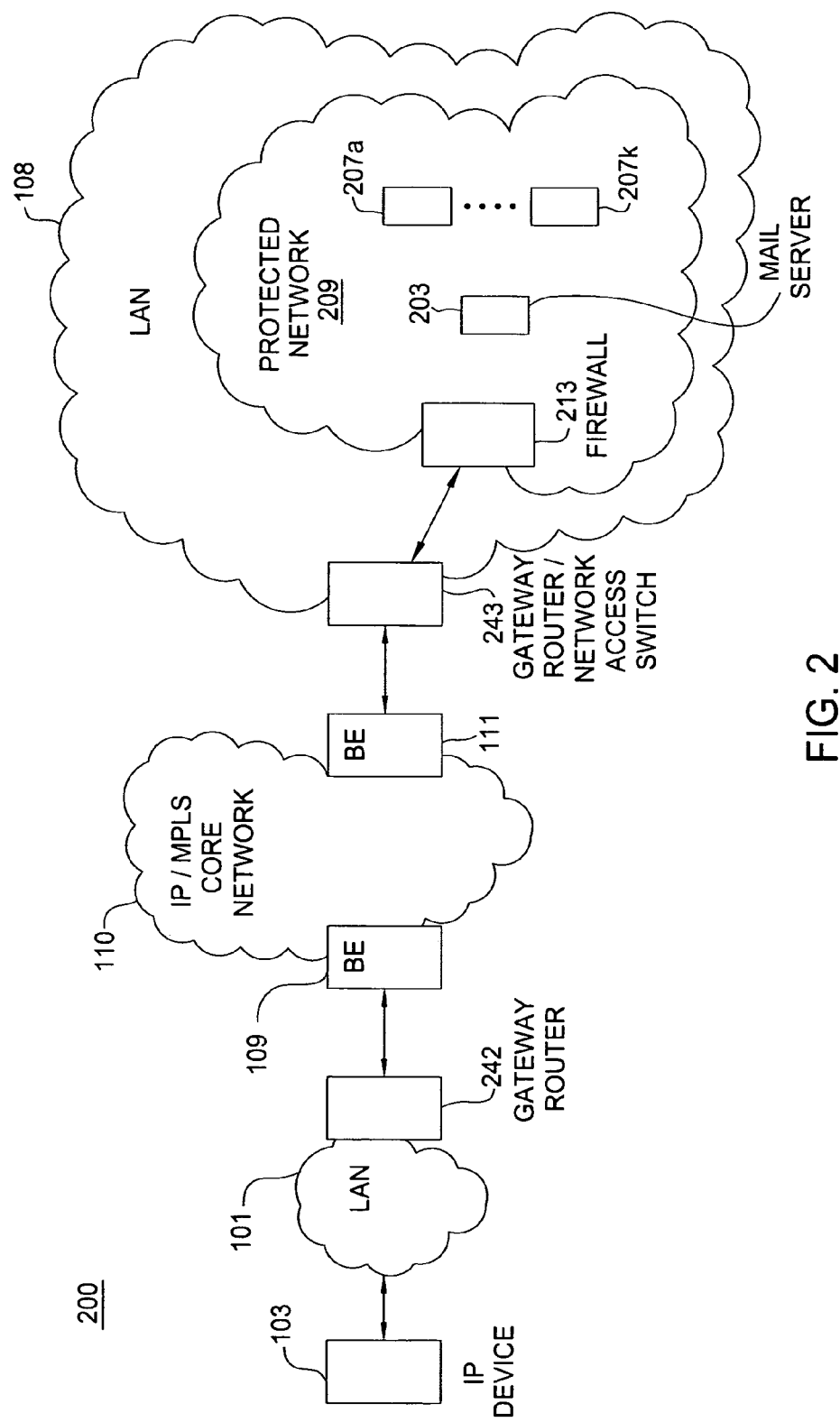
FIG. 2 illustrates an exemplary network with mail server protection.

FIG. 2 illustrates an exemplary network 200 with mail server protection of the present invention. In one embodiment, the network 200 contains a protected network 209. IP device 103 (broadly defined as a source node) located outside the protected network 209 is connected to a LAN 101 for sending packets to a plurality of protected computers 207*a* through 207*k* located in the protected network 209. Packets originated by IP device 103 outside the protected network 209 reach an IP/MPLS core network 110 via a gateway router 242, and a border element 109. The packets traverse the IP/MPLS core network 110 from border element 109 to border element 111 towards gateway router 243 located on a LAN 108. In one embodiment, gateway router 243 routes packets destined to the protected network 209 via a firewall 213, located at the edge of the protected network 209. The protected network contains at least one mail server 203 with a spam filter for preventing spam mails from reaching protected computers 207*a*-207*k*. In one embodiment, a network manager of the protected network may implement the present method for mail server protection in gateway router 243 serving as a network access switch.

In one embodiment, the network access switch (e.g., gateway router) collects statistics on an ongoing basis for every IP address from which the protected mail server receives mails. The statistics which are collected may include but are not limited to: flow level statistics (such as bytes per unit of time, packets per unit of time, connection per unit of time), and content level statistics (such as n-grams over SMTP headers, mail headers, mail content) The network access switch may also determine the distributions and variances of the collected data. The statistics for a given IP address is referred to as a feature vector f for the IP address.

In one embodiment, the network access switch also collects logs from a spam filter periodically, e.g., located in the mail server 203. For example, the network access switch may be allowing 100 email messages per second to be connected to the mail server 203, where 50 of those 100 emails may be identified as spam emails and discarded by the mail server 203.

In one embodiment, the network access switch may use the feature vector f for each IP address and/or the spam filter logs to train a classifier. The training may be performed periodically when the mail server 203 is not under overload situation (i.e., when all mails are being received). In one embodiment, the network access switch computes a spam index for every IP address that is connected to the mail server 203 as a ratio of spam mail to non-spam mail. In another embodiment, the spam index is computed for each IP address as a function that indicates a likelihood that a source IP address will send spam mails based on other measures, e.g., mails from a server that is suspected as being part of a Botnet will be deemed to possess a higher likelihood as sending spam mails.

For example, the feature vector f and the spam index for each IP address can be provided as an input to a learning algorithm, e.g., Support Vector Machine (SVM), Maximum Entropy, Maximum Likelihood, and the like to train a classifier. The classifier may then be trained to predict a spam index for a given feature vector f. For example, the spam index may range from 0 to 1, but those values may be converted to discrete values using thresholds to provide binary classification target for any of the learning algorithms. Learning algorithms such as SVM and Maximum Entropy may have probabilistic target values and may be implemented to optimize the classification error rate or the ranking error rate. Clustering IP addresses with similar statistics may also increase the robustness of the classification. For example, IP addresses sending email within the same time interval with similar feature vectors may be clustered during the training process to reduce training error.

In operation, the network access switch then instantiates the trained classifier. For example, the network access switch is able to predict the spam index for each IP address. The spam indices may be provided to a policy engine which may compute a ranked list of IP addresses connected to the protected mail server within a bounded time interval. In ranking the IP addresses, the policy engine may consider but is not limited to the following parameters: a current spam index of an IP address, a historic spam index of an IP address, a current traffic volume from an IP address, a historic traffic volume from an IP address, etc. The policy engine may output a ranked list in which each IP address has a priority index between 0 and 1.

In operation, the network access switch 243 is capable of determining the load level of the mail server 203 prior to implementing a process where connections to the mail server may be limited. For example, the network access switch 243 may obtain the load level from the mail server 203, may know how many connections it can handle priori, etc.

If and when the mail server 203 reaches or is rapidly approaching its processing limit, the network access switch 243 may start dropping connections before they reach the protected mail server such that the load on the mail server stays below 100%. In one embodiment, the process for dropping connections takes into account the IP source address of the incoming mails. For example, IP source address with priority indices of relatively low values will be dropped more frequently than IP source address with priority indices of relatively high values. In other words, the probability of a connection being dropped increases as the priority index for the connection decreases. Since the priority index is based on a measure of the likelihood of the source IP address is sending spam mails, the source IP addresses which are less likely to send spam mails will have less connection dropped in accordance with the present invention. The present invention improves significantly the performance of the mail server because a substantial amount of spam mails will not be transferred to the mail server for processing during high loading periods, while ensuring that a significant amount of legitimate mails will be forwarded to the mail server for handling.

In one embodiment, a network access switch or gateway router may not be available. In such scenario, the prioritization is enforced at the protected mail server or at a firewall for terminating a TCP connection.

Figure 3:
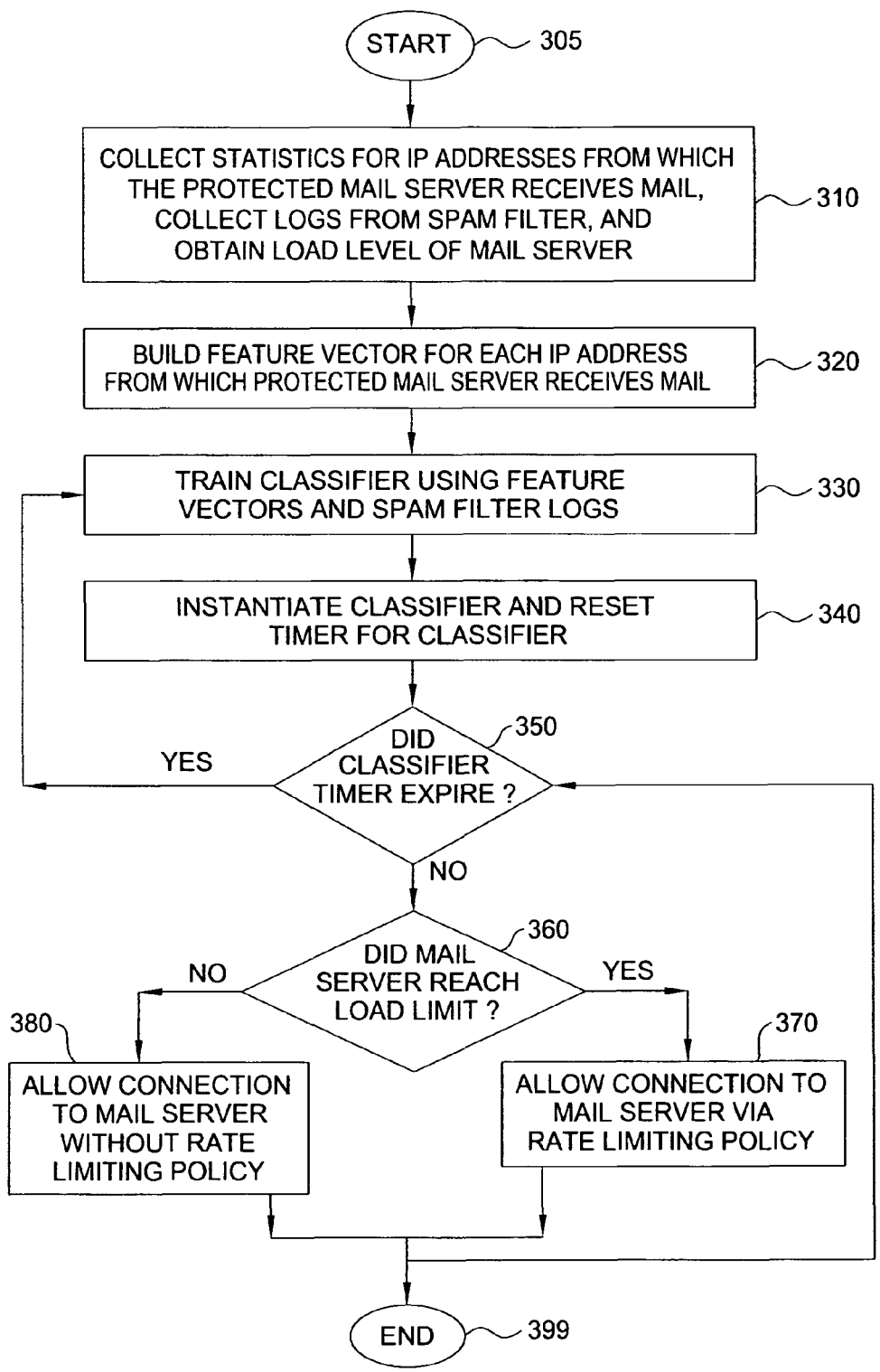
FIG. 3 illustrates a flowchart of a method for protecting mail servers.

FIG. 3 illustrates a flowchart 300 of the method for protecting mail servers. Method 300 starts in step 305 and proceeds to step 310.

In step 310, method 300 collects statistics for every IP address from which the protected mail server receives mails, collects logs from a spam filter, and/or collects a load level of the protected mail server. For example, the method may collect flow and content level statistics such as the number of bytes, packets, connections, content types, for each IP address and collects logs from the spam filter periodically. The time period is selected in accordance with the requirements of a particular deployment, e.g., every 30 minutes, every hour, every 12 hours and so on.

In step 320, method 300 builds feature vector f for the IP address. For example, the method may determine the distributions and variance of the collected data for each IP address to build the feature vector.

In step 330, method 300 trains a classifier using the feature vector f and information stored in the spam filter logs. For example, using the spam filter logs, the method computes a spam index for every IP address of a source node connected to the mail server as a ratio of spam mail to non-spam mail to indicate the likelihood that the IP address is sending spam mails. The method then provides the feature vector f and the computed spam index to a learning algorithm such as Support Vector Machine (SVM) and the like, to train the classifier. Thus, the classifier is trained to predict a spam index for a given feature vector f.

In step 340, method 300 instantiates the trained classifier and resets a timer for training classifier. For example, after the classifier is trained based on the latest collected data, the network access switch is updated to enable the network access switch to predict the spam index for each IP address based on the latest trained classifier. This ability to dynamically update a classifier will allow the present invention to dynamically adapt to changing conditions, e.g., detecting IP addresses that are suddenly sending more spam mails than non-spam mails, e.g., a computer that has been infected by a virus and has been recently converted into a Bot.

In step 350, method 300 determines whether or not the timer for classifier training has expired. If the timer expired, the method proceeds to step 330 to retrain the classifier. Otherwise, the method proceeds to step 360.

In step 360, method 300 determines whether or not the mail server has reached load limit, i.e., whether the mail server has reached or rapidly reaching its processing capacity. It should be noted that the term "reaching" broadly encompasses the condition of approaching the processing limit or the condition of actually exceeding the processing limit of the mail server. For example, the mail server is operating at 99% of its capacity and the like. If the mail server has reached the load limit, then the method proceeds to step 370. Otherwise, the method proceeds to step 380.

In step 370, method 300 allows connection to mail server via a rate limiting policy. For example, the spam indices computed by the classifier for each IP address may be provided to a policy engine which may then compute a ranked list of IP addresses connected to the protected mail server within a bounded time interval. In one embodiment, the policy engine may consider current and historical spam indices of an IP address, current and historical traffic volumes from an IP address, etc. in determining the ranked list. The ranked list may optionally assign a priority index between 0 and 1 for each IP address, may assign discrete values based on thresholding, etc. For example, IP addresses with priority index of 1 may be allowed to send mail to the mail server with no rate limit, while those with priority index of 0.5 will have 50% of TCP connection requests denied, while those with priority index of 0.1 will have 90% of TCP connection requests denied, and so on. The probability of a connection being dropped (or denied) increases as the priority index decreases. Hence, the IP addresses which are less likely to send spam have less connections being dropped. The method then proceeds to step 399 to end the current method or it may proceed back to step 350.

In step 380, method 300 continues to allow connections to the mail server without rate limiting policy. For example, the mail server may be operating only at 10% of its capacity and is able to process all spam and non-spam mails. Namely, there is no need to implement the rate limiting policy. The method then ends in step 399 or returns to step 350.

Figure 4:
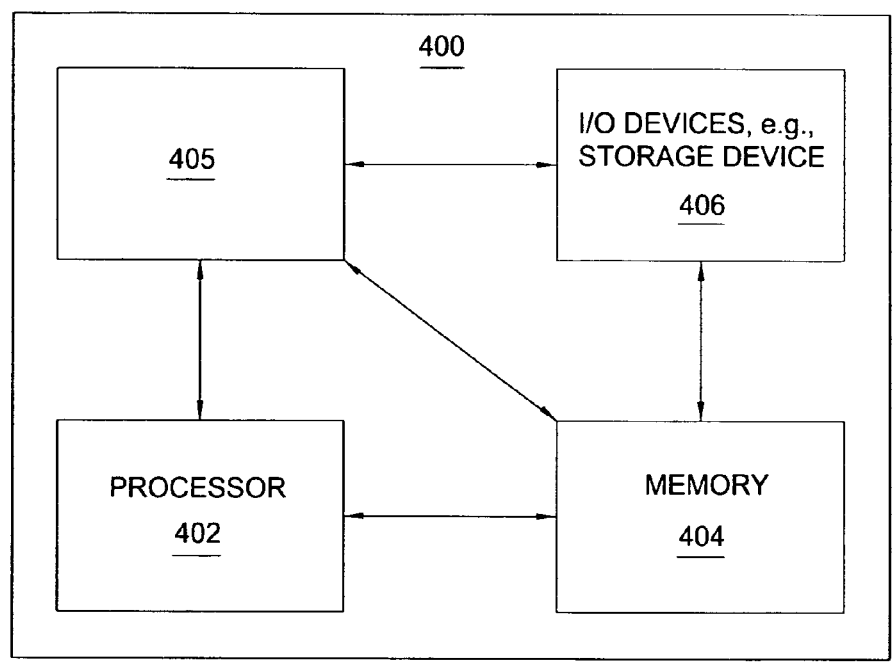
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module for protecting a mail server 405, and various input/output devices 406 (e.g., network interface cards, such as 10, 100, or Gigabit Ethernet NIC cards, Fiber Channel Host Bus Adapters, Infiniband adapters, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, or entirely in hardware, e.g., using application specific integrated circuits (ASIC), a general purpose computer or any other hardware equivalents. In one embodiment, the present module or process 405 for protecting a mail server can be loaded into memory 404 and executed by processor 402 to implement the functions as discussed above. As such, the present method 405 for protecting a mail server (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for protecting a mail server, comprising:
    detecting, via a processor, the mail server is reaching a processing limit pertaining to a load level experienced by the mail server; and
    selectively limiting connections to the mail server, via the processor, from a plurality of source nodes based on a spam index associated with each of the plurality of source nodes, wherein the spam index is associated with an internet protocol address of each of the plurality of source nodes, wherein the spam index is converted into a priority index, wherein the priority index indicates a probability of a connection to a respective internet protocol address being dropped, wherein the spam index comprises a ratio of spam mail to non-spam mail, wherein the spam index is generated by a classifier, wherein the classifier is trained using a plurality of feature vectors, wherein each of the plurality of feature vectors is derived from flow level statistics, wherein each of the plurality of feature vectors is further derived from content level statistics of a corresponding source node of the plurality of source nodes, wherein the classifier is further trained using a plurality of spam indices associated with each of the plurality of feature vectors, wherein the plurality of spam indices associated with each of the plurality of feature vectors is generated from spam filter logs provided by a spam filter.

2. The method of claim 1, wherein the classifier is dynamically trained.

3. The method of claim 1, wherein the priority index for each of the plurality of source nodes further accounts for a historical traffic volume.

4. A non-transitory computer-readable medium storing a plurality of instructions which, when executed by a processor, cause the processor to perform operations for protecting a mail server, the operations comprising:
    detecting the mail server is reaching a processing limit pertaining to a load level experienced by the mail server; and
    selectively limiting connections to the mail server from a plurality of source nodes based on a spam index associated with each of the plurality of source nodes, wherein the spam index is associated with an internet protocol address of each of the plurality of source nodes, wherein the spam index is converted into a priority index, wherein the priority index indicates a probability of a connection to a respective internet protocol address being dropped, wherein the spam index comprises a ratio of spam mail to non-spam mail, wherein the spam index is generated by a classifier, wherein the classifier is trained using a plurality of feature vectors, wherein each of the plurality of feature vectors is derived from flow level statistics, wherein each of the plurality of feature vectors is further derived from content level statistics of a corresponding source node of the plurality of source nodes, wherein the classifier is further trained using a plurality of spam indices associated with each of the plurality of feature vectors, wherein the plurality of spam indices associated with each of the plurality of feature vectors is generated from spam filter logs provided by a spam filter.

5. The non-transitory computer-readable medium of claim 4, wherein the classifier is dynamically trained.

6. The non-transitory computer-readable medium of claim 4, wherein the priority index for each of the source nodes further accounts for a historical traffic volume.

7. An apparatus for protecting a mail server, comprising:
    a processor; and
    a computer readable medium storing a plurality of instructions which, when executed by the processor, cause the processor to perform operations, the operations comprising:
        detecting the mail server is reaching a processing limit pertaining to a load level experienced by the mail server; and
        selectively limiting connections to the mail server from a plurality of source nodes based on a spam index associated with each of the plurality of source nodes, wherein the spam index is associated with an Internet protocol address of each of the plurality of source nodes, wherein the spam index is converted into a priority index, wherein the priority index indicates a probability of a connection to a respective internet protocol address being dropped, wherein the spam index comprises a ratio of spam mail to non-spam mail, wherein the spam index is generated by a classifier, wherein the classifier is trained using a plurality of feature vectors, wherein each of the plurality of feature vectors is derived from flow level statistics, wherein each of the plurality of feature vectors is further derived from content level statistics of a corresponding source node of the plurality of source nodes, wherein the classifier is further trained using a plurality of spam indices associated with each of the plurality of feature vectors, wherein the plurality of spam indices associated with each of the plurality of feature vectors is generated from spam filter logs provided by a spam filter.

8. The method of claim 1, wherein the priority index for each of the plurality of source nodes further accounts for a current traffic volume.

9. The method of claim 1, wherein the spam index comprises a historical spam index.

* * * * *